United States Patent [19]

Gardner

[11] 4,160,758
[45] Jul. 10, 1979

[54] METHOD OF MANUFACTURE OF ELASTOMER POLYESTER MOLDING COMPOUNDS

[75] Inventor: Irwin J. Gardner, Scotch Plains, N.J.

[73] Assignee: Exxon Research & Engineering Co., Florham Park, N.J.

[21] Appl. No.: 873,102

[22] Filed: Jan. 30, 1978

[51] Int. Cl.$^2$ .......................... C08G 63/52; C08J 3/20
[52] U.S. Cl. .................... 260/40 R; 525/168
[58] Field of Search ............... 260/40 R, 862

[56] References Cited
U.S. PATENT DOCUMENTS

| | | | |
|---|---|---|---|
| 3,302,410 | 2/1967 | McLeon | 260/40 R |
| 3,577,478 | 5/1971 | Thorpe | 260/862 |
| 3,887,515 | 6/1975 | Pennington | 260/862 X |

Primary Examiner—Sandra M. Person

Attorney, Agent, or Firm—A. H. Krumholz; H. L. Cohen

[57] ABSTRACT

Methods for preparing reinforced molding compounds are disclosed, comprising preparing a first paste component from a mixture of a thermosetting unsaturated polyester component, a free radical polymerizable monomer component and an inorganic particulate filler component, preparing a second paste component from a conjugated diene butyl elastomer copolymer component, a free radical polymerizable monomer component, and an inorganic particulate filler component, and combining the first and second paste components in order to produce an elastomer modified thermosetting unsaturated polyester molding compound having improved surface appearance, toughness and impact strength. Preferably, one or both of the paste components will include a thermoplastic polymer additive component to provide low profile qualities to the product.

10 Claims, No Drawings

METHOD OF MANUFACTURE OF ELASTOMER POLYESTER MOLDING COMPOUNDS

BACKGROUND OF THE INVENTION

The present invention relates to methods of preparing polyester molding compositions. More specifically, the present invention relates to methods of preparing reinforced polyester molding compositions, and still more particularly to methods of preparing improved "low-profile" molding compositions.

Reinforced molding compositions containing unsaturated polyesters and high proportions of reinforcing agents (such as glass fibers) and fillers are well known in the art. It has also been known to modify these compositions by employing a thermoplastic additive, such as poly (methyl methacrylate), polyvinylacetate, or polystyrene, in order to provide a two-phase system which has improved surface appearance and other physical properties. These compositions have been employed as both sheet molding and bulk molding compounds for the fabrication of various products therefrom, and are known to possess high strength and rigidity when used for these purposes. For example, U.S. Pat. Nos. 3,701,748 and 3,722,241 both assigned to Rohm and Haas Company, disclose liquid polymerizable compositions comprising unsaturated polyesters, thermoplastic polymers, and free radical polymerizable monomers. These materials have, however, been of limited value in connection with many large volume applications because of their deficiencies in impact resistance, flexibility and resilience. In general, these thermoplastic additive modified sheet or bulk molding compounds have been referred to as "low profile" systems because the finished articles are characterized by having reduced surface roughness, which is an otherwise common result of shrinkage in the molding of such reinforced polyester compositions. The thermoplastic additives have thus been referred to as anti-shrink additives.

Attempts have been made to improve the impact resistance and flexibility of these compounds by the addition of elastomeric additives thereto. However, because these materials are grossly incompatible both with the unsaturated polyester resin itself as well as the anti-shrink additive, this has not been possible. For example, it has not been possible to retain the polyester-elastomer mixture dispersed in monomer for a sufficient time to prepare and fabricate the composition, and the inhomogeniety of the blend has been reflected in the resultant poor physical properties and lack of uniform appearance in the cured products.

As an example of the above, U.S. Pat. No. 4,020,036, assigned to Phillips Petroleum Company, describes the difficulties in attempting to provide unsaturated polyester compositions containing rubber, and then goes on to disclose a thermosetting polymer composition comprising an unsaturated polyester, a vinyl monomer, a catalyst, a reinforcing agent or filler, and a normally solid carboxy-containing block co-polymer, such as a carboxylated block copolymer of butadiene and styrene.

A relatively recent development in connection with elastomers concerns conjugated diene butyl elastomeric copolymers, such as those described in U.S. Pat. No. 3,816,371, which issued on June 11, 1974 to Baldwin et al, and U.S. Pat. No. 3,775,387, which issued on Nov. 27, 1973 to Baldwin. Furthermore, Application Ser. No. 619,294 filed on Oct. 3, 1975 by Irwin Gardner, teaches a method of curing such elastomers with monomer absorbed onto a granular absorbant and dispersed into the elastomer.

It has not heretofor been possible, however, to produce the referred-to unsaturated polyester molding compounds including such elastomers therein, primarily due to the incompatibility of these materials as discussed above.

SUMMARY OF THE INVENTION

In accordance with the present invention methods have now been discovered for producing elastomer modified thermosetting unsaturated polyester molding compounds having improved surface appearance, toughness and impact strength. Such methods comprise preparation of a first paste component which includes a mixture of an unsaturated polyester component, a free radical polymerizable monomer component, and an inorganic particulate filler component, preparing a second paste component which includes a mixture of a conjugated diene butyl elastomer copolymer component, a free radical polymerizable monomer component, and an inorganic particulate filler component, and combining the first and second paste components.

In a preferred embodiment of the methods of the present invention the two paste components are mixed together in a low shear mixing apparatus.

In another embodiment of the present invention at least one of the two paste components will also include a thermoplastic polymer additive component and in a particularly preferred embodiment the thermoplastic polymer additive component will be polystyrene, polyvinylacetate, or poly(methyl methacylate).

In another embodiment of the present invention a reinforcing agent will also be added to one of the paste components, the reinforcing agent comprising a fibrous or filamentary material such as glass, metal, silicate, asbestos fibers, and the like.

In another embodiment of the present invention small but effective amounts of various conventional additional components can be added to the paste compositions hereof, including conventional polymerization catalysts or initiators, inhibitors, retarders, pigments or colorants, modifiers, thickening agents such as calcium and magnesium oxides and hydroxides, as well as mold release agents, such as calcium or magnesium stearate, etc.

In a preferred embodiment of the present invention the inorganic particulate filler material will be an inorganic metal carbonate, such as calcium carbonate. It will also be highly preferred that the free radical polymerizable monomer will be styrene.

DETAILED DESCRIPTION

The unsaturated polyesters useful in accordance with the present invention are well-known in the art, and comprise those thermosetting polyesters prepared by condensation of a dibasic acid including at least in part an ethylenically unsaturated dicarboxylic acid or anhydride, or mixtures thereof, and a dihydric alcohol, or mixtures thereof, with varying amounts of a saturated dicarboxylic acid or anhydride being added to modify the polyester. Preferred unsaturated acids or anhydrides for use herein are maleic and fumaric acid or anhydride. Examples of other such acids or anhydrides include itaconic, citraconic, chloromaleic, mesaconic and glutaconic acids or anhydrides. Preferred saturated modifiers include phthalic, adipic, zelaic, isophthalic, chlorendic and tetraflorophthalic acids and anhydrides.

Typical diols for use herein include various linear glycols, such as ethylene glycol, propylene glycol, dipropylene glycols, diethylene glycol, 1,3-butanediol, neopentyl glycol, 1,4-cyclohexane dimethanol and mixtures of such glycols and cyclohexanedi-methanol and hydroxy alkyl ethers of Bisphenol A.

In the first paste component of the present invention the unsaturated polyester component will be present in an amount such that the ratio of the concentration of the polyester component to the total concentration of the conjugated butyl diene (CDB) elastomer component and the thermoplastic polymer component (if any) in the final product will range from about 5:1 to about 1:1. This of course does not include the free radical polymerizable monomer component of the polyester resin used in this paste component, or the second such paste component, used in preparing the molding compounds of the present invention, which will be discussed below and treated separately herefrom.

These unsaturated polyesters are those commonly used with a free radical polymerizable monomer such as a vinyl monomer, which acts as a crosslinking moiety, and in combination thus comprises the polyester resin.

Illustrative of free radical polymerizable monomers useful in the present invention are the various acrylic beta-alkyl substituted derivatives in which the alkyl group contains 1 to 8 carbon atoms such as ethyl-, propyl-, butyl-, amyl-, hexyl-, heptyl- and octylacrylic acid, phenyl acrylic acid, vinyl acrylic acid and the like; acrylate monomers such as methyl acrylate, methyl methacrylate, ethyl acrylate, butyl methacrylate, butyl acrylate, acrylamide, methacrylic anhydride, alkylamino, dialkyl amino acrylates and the like. Also suitable are the styrene monomers and various substituted derivatives thereof such as styrene, alphamethyl styrene, amino styrene, methylethyl amino styrene, methoxy styrene, chlorostyrene, dichlorostyrene, di- or trimethyl styrene, t-butyl styrene, sodium styrene sulfonate, p-benzyl styrene, p-phenoxy styrene and similar aryl substituted styrenes.

Further illustrations of free radical polymerizable monomers useful in the practice of the present invention are monomers containing carboxylic acid ester, or anhydride groups such as maleic anhydride, fumaric acid, crotonic acid, itaconic acid and anhydride, maleimide and fumarates such as diethyl fumarate and dioctyl fumarate, dialkyl phthalate, and trialkyl cyanurate, conjugated dienes such as 1,3-butadiene, isoprene, piperylene, methyl pentadiene, chloroprene and methoxy, ethoxy and cyano derivatives of conjugated dienes such as 2-methoxybutadiene, 1-cyanobutadiene. Acrylonitrile and derivatives thereof such as methacrylonitrile are also suitable.

A broad category of free radical polymerizable monomers useful in the present invention are the various vinyl monomers and vinylidene monomers such as vinyl acetate, vinyl acetylene, vinyl chloride, vinylene carbonate, vinyl-2-chloroethyl ether, vinylidene chloride, $C_8$–$C_{18}$ alkyl vinyl ethers, vinyl esters of $C_8$–$C_{18}$ fatty acids, 2-vinyl furan, vinyl phenol, vinyl toluene, vinyl phenyl disiloxane, 2- and 4-vinylpyridine, vinyl pyrrole, vinyl pyrrolidene, vinyl sulfonic acid, vinyl urethane, methyl vinyl ketone, 2- vinylquinoline, vinyl carbazole as well as divinyl monomers such as divinyl benzene, 2,3-divinyl pyridine, divinyl sulfone and 2,5-divinyl-6-methyl pyridine. Other monomers include silanes such as propenyl triethoxy silane, tris-(trimethylsiloxy)-vinyl silane, vinyl ethyl diethoxy silane and the like.

The most preferred free radical polymerizable monomers for use in connection with the present invention include styrene, vinyl toluene, diallyl phthlate, triallyl cyanurate, chlorostyrene, divinyl benzene, alphamethyl styrene, methyl methacrylate, methyl acrylate, and the like, with styrene being particularly preferred. In the final polyester molding compounds produced in accordance with the method of the present invention, these monomers will be present in amounts (based on the product prior to cross-linking) ranging from about 25 to 180 parts of monomer for each 100 parts by weight of the combination of unsaturated polyester, conjugated diene butyl elastomer copolymer and thermoplastic polymer, if any.

It will also be apparent to those skilled in this art that where styrene is employed, for example, as the vinyl monomer component, that other monomers can also be added to these compositions in order to obtain desired dilution effects, or to modify the ultimate cure rate or other physical properties of the final products hereof.

Free radical catalysts or initiators are also required in order to cure the polyester composition by initiating the crosslinking reaction. While an organic peroxide is usually employed, it is also possible to employ organic hydroperoxides and azo compounds. The amount of initiator employed will generally range from about 0.1 to about 4 parts by weight, and preferably 1 to 2 parts by weight, of the initiator per 100 parts by weight of the mixture of unsaturated polyester, conjugated diene butyl elastomer copolymer, thermoplastic polymer, and free radical polymerizable monomer in the final product.

Illustrative of some peroxides useful in this invention include the dialkyl and diacyl peroxides.

The dialkyl peroxides have the general structure R—OO—R', where R and R' can be the same or different primary, secondary or tertiary alkyl, cycloalkyl, aralkyl, or heterocyclic radicals. Included in this group of peroxides which are suitable for use in this invention are dicumyl peroxide, di-t-butyl peroxide, t-Butylcumyl peroxide and 2,5-Dimethyl-2,5-bis (t-butyl peroxy) hexane.

Diacyl peroxides have the general structure RC(O)OOC(O)R' where R and R' are the same or different alkyl, cycloalkyl, aralkyl, aryl or heterocyclic radicals. Illustrative of some diacyl peroxides suitable for use in this invention are dilauroyl peroxide, dibenzoyl peroxide, dicetyl peroxide, didecanoyl peroxide, di (2,4-dichlorobenzoyl) peroxide, diisononanoyl peroxide and 2-methylpentanoyl peroxide. In addition, additional peroxides useful in accordance with this invention include methyl ethyl ketone peroxide, cyclohexanone peroxide, and the like, as well as the particularly preferred peresters, such as t-butyl peroctoate and t-butyl perbenzoate.

As will be evident to those skilled in the art any organic peroxide or other free radical or sources thereof which are useful in crosslinking polymers or initiating polymerization are encompassed in the present invention.

The basis for choice of free radical initiators for use in this invention include such things as the half life of the initiator at the mixing and/or curing temperature of the selected initiator in the system.

Examples of hydroperoxides which are suitable for use in the present invention include t-butyl hydroperoxide, cumyl hydroperoxide, 2,5-dimethyl-2,5 dihydroperoxyhexane, and diisopropylbenzenehydroperoxide.

Examples of some azo compounds which are suitable for use as free radical initiators in this invention include diazoaminobenzene, N,N'-dichloroazodicarbonamide, azo dicarboxylic acid diethyl ester, 1-cyano-1-(t-butylazo) cyclohexanone and azo bis (isobutyronitrile).

There are also special additives commonly employed in such polyester bulk or sheet molding compounds and these include flame retardant agents such as antimony oxide, hydrated alumina, chlorendic anhydride, or halogenated polyesters such as tetrachloro- and tetrabromophthalic anhydride, or halogenated monomers such as dibromostyrene and mono- and di- chlorostyrene or phosphorous containing compounds such as triethyl phosphate.

It is usually necessary to employ a thickening agent therein, such as the oxides and/or hydroxides of magnesium and calcium, which are commonly used to modify viscosity as required. Other conventional special purpose additives include the inhibitors and retarders, such as hydroquinone, p-benzoquinone for the polyester component and t-butylcatechol used as a monomer inhibitor as well as compounds such as toluquinone and mono-t-butylhydroquinone.

The conventional thermoplastic or anti-shrink additives used for bulk molding or sheet molding compounds based on unsaturated polyester resins most commonly include polystyrene, polyvinylacetate, or poly(-methyl methacrylate), but other polymers having thermoplastic qualities such as polyvinyl chloride, polypropylene, linear polyethylene, polyamides, polycarbonates and cellulosic polymers can be used.

Examples of thermoplastic additive polymers which can thus be employed in the present invention include homopolymers of methyl, ethyl, and butyl methacrylate, methyl and ethyl acrylate, copolymers of methyl methacrylate and lower alkyl esters of acrylic and methacrylic acids, and copolymers of methyl methacrylate with minor amounts of one or more of the following: lauroyl methacrylate, isobornyl methacrylate, acrylamide, hydroxyethyl methacrylate, styrene, 2-ethylhexyl acrylate, acrylonitrile, methacrylic acid, methacrylamide, methylol acrylamide, and cetyl stearyl methacrylate. Other useful examples of the thermoplastic polymer include styrene/acrylonitrile copolymers, vinyl chloride/vinyl acetate copolymers, cellulose acetate butyrate, and cellulose acetate propionate.

These thermoplastic additives are present in amounts such that in the final polyester molding compound the ratio of conjugated diene butyl elastomer copolymer to the thermoplastic polymer additive will range from zero up to about 20.

One of the paste components used in the method of the present invention, as discussed above, includes a conjugated diene butyl elastomeric copolymer dispersed therein. These conjugated diene butyl elastomeric copolymers are known and are described in U.S. Pat. No. 3,816,371 issued June 11, 1974 to Baldwin et al and U.S. Pat. No. 3,775,387 issued Nov. 27, 1973 to Baldwin as well as U.S. application Ser. No. 465,479 filed by Baldwin et al on Apr. 30, 1974, all of which are incorporated herein by reference thereto.

These conjugated diene butyl elastomers may be generally described as copolymers consisting of from 85 to 99.5% by weight of a $C_4$-$C_7$ isoolefin combined with 15 to 0.5% by weight of a conjugated diolefin having 4 to 14 carbon atoms, the copolymer containing randomly distributed sites of conjugated diene unsaturation. Moreover, as described in U.S. application Ser. No. 465,479 filed by Baldwin et al on Apr. 30, 1974, the conjugated diene functionality may be present such that both olefin units are in the backbone chain, or both are outside of the chain, or one may be inside the chain and one outside, or both may be present in a ring, such as by dehydrohalogenation of allylic halogen of cyclopentadiene. Dehydrohalogenation of a butyl-type polymer prepared from dimethylbutadiene and isobutylene can provide conjugated olefinic structures having the following configurations:

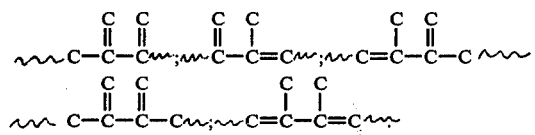

Preferably the copolymers useful in the present invention are copolymers of isobutylene and isoprene, a major portion of the isoprene units combined therein having conjugated diene unsaturation and may be represented by the following structure:

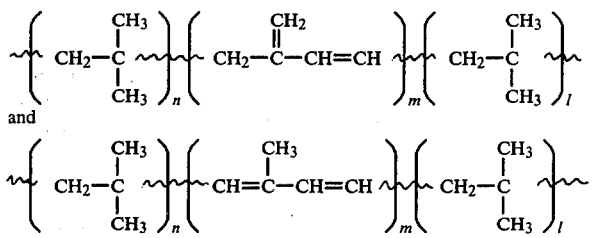

where n+1 represent the number of isoolefin units incorporated into the butyl rubber polymer backbone and m represents the number of conjugated diolefin units present substantially as isolated units.

The preferred method of preparing the elastomers useful in the present invention is through dehydrohalogenation of a halogenated butyl rubber.

The term "butyl rubber" is used in the industry to describe copolymers made from a reaction mixture containing 70 to 99.5% by weight of a $C_4$-$C_7$ isoolefin such as isobutylene and 30 to 0.5% by weight of a $C_4$-$C_{14}$ conjugated multiolefin such as isoprene. The resulting copolymers contain 85 to 99.5% by weight of isoolefin and 0.5 to 15% of combined multi-olefin. The polymer backbone of commercial butyl rubber consists primarily of isobutylene units with just a few percent of isoprene units, the latter contributing the small amount of unsaturation present in butyl rubber.

Halogenated butyl rubber is described in U.S. Pat. No. 3,099,644 and is typified by the following formula:

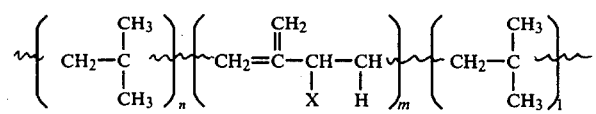

Halogenated butyl rubber may be prepared by halogenating butyl rubber in a solution containing 1 to 60% by weight butyl rubber in a substantially inert $C_5$-$C_8$ hydrocarbon solvent such as pentane, hexane, heptane and contacting the solution with halogen gas from about 2 to 25 minutes whereby halogenated copolymers form containing up to 1 or somewhat more halogen atom per double bond initially present. Illustrative is "Chlorobutyl 1068" a chlorinated butyl rubber which before halogenation contains about 1.8 mole % unsaturation and a viscosity average molecular weight of about 450,000.

The conjugated diene butyl elastomers useful in the present invention are preferably prepared via dehydrohalogenation of a halogenated butyl rubber. Generally this process comprises contacting a solution of halogenated butyl rubber with: (1) a soluble metal carboxylate where the metal is selected from the metal of Groups Ib, IIb, IVa and VIII of the Periodic Table; (2) a soluble carboxylic acid; and (3) an oxide or a hydroxide of the metal selected from Groups Ia and IIa of the Periodic Table. This dehydrohalogenation process is described in detail in U.S. Pat. No. 3,775,387 issued Nov. 27, 1973 to Baldwin et al and is also incorporated herein by reference thereto.

The mole percent of conjugated diene unsaturation in the elastomers useful in the present invention is from about 0.2 to about 5.0 and these conjugated diene butyl elastomer copolymers have a number average molecular weight generally from about 5,000 to 500,000.

As discussed previously any attempt to mix the above-noted components, including the unsaturated polyester component, the conjugated diene butyl elastomer copolymer component and any low shrink polymer which also may be present therein, all in combination with the free radical polymerizable monomer, results in great difficulties. These components are entirely incompatible, and an inhomogenous blend is prepared which quickly separates.

It is also noted that the paste components utilized in the method of the present invention will include a total amount of an inorganic particulate filler, such that there will be from about 100 to about 800 parts by weight, and preferably 100 to 400 parts by weight, of the filler for each 100 parts by weight of the combination of polyester, conjugated butyl diene elastomer, thermoplastic polymer and vinyl monomer in the final products. These materials comprise water-insoluble fillers including inorganic metal carbonates, such as calcium carbonate which is the most preferred such filler material for use herein, and which can comprise either the precipitated or wet ground types. The filler material can in addition, however, include silicates, such as calcium silicate, ground or hydrated silica, various clays, such as calcined clays, chalk, talc, limestone, anhydrous calcium sulfate, barium sulfate, asbestos, powdered glass, quartz, aluminum trihydrade, various oxides, such as aluminum oxide, antimony oxide, inert iron oxides and the like, and ground stone of various types.

It has been found that by simply adding the CDB resin, including the monomer, to a solution of the other polymerizable components, i.e. including the polyester components, in addition to the filler material, does not produce a satisfactory dispersion, particularly when employing a conventional low shear sigma blade type mixer, and thus a product results upon curing which has inferior physical properties and unacceptable appearance. By employing the paste compositions discussed above, however, with the pastes having relatively comparable viscosities, the resultant product includes the conjugated diene butyl elastomer copolymer dispersed uniformly throughout the composition, and the paste displays relatively long term stability and little tendency to separate into two phases. The combined pastes may then be compounded with fibrous or filamentary reinforcing agents, such as glass (chopped or powdered), metal, silicate or asbestos fibers, cellulosic fibers, carbon, graphite, natural fibers, such as cotton, jute hemp, sisal, flax, wood, paper, and the like, and other synthetic fibers such as nylon, saturated polyester or acrylic fibers, polyamides, polyolefins, etc. Most preferably chopped glass fibers will be added to the composition at this point. The amount of fibrous or filamentary reinforcing agent so utilized will be such that the final product includes from about 40 to 200 parts by weight, preferably 15 to 100 parts by weight, of the reinforcing agent for each 100 parts by weight of polyester, conjugated diene butyl elastomer, thermoplastic additive plus vinyl monomer.

As noted above, additional components of the compositions of the present invention can include pigments, colorants, lubricants or mold release agents, stabilizers and silane coupling agents.

The use of thickeners is, however, generally necessary in order to produce a product of the proper physical composition. These thickeners include the oxides and/or hydroxides of metals of groups IIA and IIB of the Periodic Table, such as the oxides and hydroxides of magnesium, calcium, strontium, barium, and zinc, with magnesium and/or calcium preferred. These materials will be utilized in amounts such that from about 1 to 10 parts by weight, preferably 1 to 5 parts by weight of the thickening agent will be present for each 100 parts by weight of the polyester, conjugated diene butyl elastomer copolymer, thermoplastic polymer plus vinyl monomer in the final product. This resultant product will thus attain a viscosity ranging from about 50,000 up to values in excess of 500,000 cps, for example up to about 2,000,000 cps.

As for the additional components noted above, the pigments and/or colorants, where desired, will generally comprise materials such as $TiO_2$, carbon black, phthalocyanine pigments and the like, generally employed in sufficient amounts to impart the desired color, such as from about 1 to 5 parts by weight for each 100 parts by weight of the paste prior to addition of any reinforcing agent.

Mold release agents or lubricants can be added in amounts such that there are from about 1 to 15 parts by weight of mold release agent for each 100 parts by weight of the paste, i.e. polyester, conjugated diene butyl elastomer copolymer, thermoplastic additive and vinyl monomer. These materials include aluminum, barium, calcium, magnesium or zinc stearate and the like, and are added proportionally to the two paste compositions, but preferably in the paste composition which includes the CDB elastomer copolymer.

Finally, stabilizers such as barium or cadmium soaps, tin compounds such as tin octanoate, a phosphite such as dimethyl phosphite, tris(nonylphenyl) phosphite, alkyl phenols such as BHT, quinones, amines, and the like can also be employed therein.

During the preparation of the two separate paste components, and prior to their admixture, it is preferred at this point that the normal compounding additives and other materials discussed above be added to the unsaturated polyester resin solution, preferably prior to addition of the inorganic filler material, such as calcium carbonate, thereto. It is also possible to store the separate pastes for extended periods of time prior to their admixture. However, if the unsaturated polyester resin solution is to be stored prior to use thickening agents should not be added to the paste until shortly prior to its combination with the paste including the conjugated diene butyl elastomer copolymer. When the two pastes are combined they can be combined in conventional low shear mixing equipment with the improved results discussed above then being realized.

While the ranges for each of the components listed above are applicable, preferred compositions in accordance with this invention will include from about 50 to 70 parts by weight of unsaturated polyester plus free radical polymerizable monomer (where the polyester is from about 45 to 75 weight percent of that combination) for each 100 parts by weight of polyester monomer, CDB elastomer copolymer and thermoplastic polymer in the final product. In another preferred embodiment, for each 30 to 50 parts by weight of CDB elastomer copolymer, thermoplastic additive plus monomer (where the combination of CDB plus thermoplastic additive is from about 25 to 50 weight percent of that total) for each 100 parts by weight of unsaturated polyester, CDB, monomer plus thermoplastic additive, and where the ratio of CDB to the thermoplastic additive is from about 5:1 to 1:3 in the final product.

The invention is illustrated further by the following examples therein.

EXAMPLE 1

The following first paste formulation was prepared:

| | |
|---|---|
| 65 wt. % solution of propylene glycol maleate polyester in styrene | 60 parts |
| 40 wt. % solution of polymethylemthacrylate in styrene | 40 parts |
| t-butyl perbenzoate | 1.25 parts |
| zinc stearate | 3.00 parts |
| $CaCO_3$ | X parts |
| $Mg(OH)_2$ | 3.0 parts |
| Chopped glass fibers (¼ inch, silane treated) | 75 parts |

To this formulation was added varying amounts of a second paste formulation comprising a 40 wt. % solution of CDB elastomer in styrene, which was added in the form of a $CaCO_3$ paste, the paste containing equal parts by weight of CDB-styrene solution and $CaCO_3$. The amount of $CaCO_3$ in the first paste formulation (X) was based on the fact that a total of 150 parts of $CaCO_3$ was used in the two paste formulations. The CDB modified compositions are set forth in Tables I and II below as compounds B, C, D and E. A control formulation was also prepared, molded, cured and tested, and this formulation is reported as compound A therein.

The method of preparation of these formulations was as follows. The polyester-styrene and thermoplastic-styrene mixtures were weighed into tared beakers and mixed for half a minute at high speed. The beaker was maintained in an ice water bath. Peroxide was added and mixed for an additional half minute; zinc stearate was quantitavely added with slow stirring for one-half minute, and then mixed for one-half minute at high speed. The $CaCO_3$ was added at high speed for two minutes. Then the $CDB/styrene/CaCO_3$ paste was mixed in at 100 rpm for 3.5 minutes and thereafter the $Mg(OH)_2$ was added, then the glass fibers were added while mixing the paste in a Brabender Mixer at 40 rpm at 25° C. All samples were cured in a 15.24 cm×15.24 cm×0.190 cm single cavity preheated chrome plated mold treated with teflon mold release. The curing temperature was 150° C. with curing times of either 1.5 or 3.0 minutes. Specific gravity and viscosity properties of the formulations prior to cure are set forth in Table I and Table II lists the physical properties of the cured compositions.

These results demonstrate that the improved molding compounds of the present invention have increased toughness qualities which are currently defined in terms of their ability to absorb greater amounts of energy under impact while retaining acceptable levels of flexural modulus, high tensile and flexural elongation, Barcol hardness without loss, and preferably with an increase, in tensile strength. The modified molding compositions of the present invention have been found to exhibit these desirable properties as well as providing the low profile characteristics of high surface gloss and smoothness and a reduction in or elimination of shrinkage.

TABLE I

| Compound: 4187-74 | A | B | C | D | E |
|---|---|---|---|---|---|
| 1:1[40/60 CDB/Styl/$CaCO_3$ | — | 16.7 | 33.4 | 66.8 | 80 |
| Sp. G of paste | 1.65 | 1.59 | 1.54 | 1.45 | 1.54 |
| Sp. G of paste + glass | 1.80 | 173 | 1.67 | 1.57 | 1.68 |
| Brookfield Visc. cps × $10^{-4}$ at 25° C. (no $Mg(OH)_2$) | 48.0 21.5 | 24.0 23.2 | 17.6 24.5 | 9.6 24.5 | 27.2 29 |
| Brookfield Visc. cps × $10^{-6}$ at 25° C. 96 hrs. after addn. of $Mg(OH)_2$ | 27.2 | 35.2 | 39.5 | 20.4 | 8.7 |

TABLE II

PHYSICAL PROPERTIES OF CDB MODIFIER POLYESTERS

| Compound | Secant Mod.[1] MPa | Flexural[1] Mod.,MPa | Tensile Str.[2] MPa | Tensile Elong. % | Flex.[3] Def. cm | Mold[4] Expansion cm/cm | Barcol[5] Hardness |
|---|---|---|---|---|---|---|---|
| Cured 3' at 150° C. (Aged 8 Days)[6] | | | | | | | |
| 4187-74 | | | | | | | |
| A | 8480 | 9515±275 | 33.16±3.0 | 1.13±.08 | 0.064±.002 | .00120 | 61.2±2.4 |
| B | 8067 | 9446±758 | 42.33±4.1 | 1.47±.08 | 0.0084±.018 | .00126 | 55.4±2.1 |
| C | 6412 | 7308±896 | 28.27±2.1 | 1.11±.04 | 0.100±.000 | .00128 | 37.3±7.6 |
| D | 5378 | 6757±551 | 43.23±18.3 | 1.93±.72 | 0.097±.005 | .00127 | 35.2±2.3 |
| E | 5722 | 7722±620 | 36.75±7.9 | 1.57±.31 | 0.091±.012 | .00123 | 46.5±3.4 |
| Cured 1.5' at 150° C. (Aged 8 Days)[6] | | | | | | | |
| A | 9377 | 9790±579 | — | — | 0.053±.006 | — | 60.8±1.8 |
| B | 5950 | 8480±365 | — | — | 0.076±.015 | — | 55.6±3.8 |
| C | — | 8549±441 | — | — | 0.079±.018 | — | 54.0±3.0 |
| D | 4909 | 6239±103 | — | — | 0.096±.010 | — | 36.4±3.9 |
| E | 4971 | 7101±296 | — | — | 0.083±.016 | — | 41.4±2.1 |
| Cured 1.5' at 150° C. (Aged 20 Days)[6] | | | | | | | |
| A | — | 10963±1-172 | 30.99±9.21 | 0.91±.17 | 0.077±.006 | — | 67.0±2.9 |

TABLE II—Continued
PHYSICAL PROPERTIES OF CDB MODIFIER POLYESTERS

| Compound | Secant Mod.[1] MPa | Flexural[1] Mod.,MPa | Tensile Str.[2] MPa | Tensile Elong. % | Flex.[3] Def. cm | Mold[4] Expansion cm/cm | Barcol[5] Hardness |
|---|---|---|---|---|---|---|---|
| B | — | 9377±282 | 38.72±4.07 | 1.26±.09 | 0.082±.007 | — | 56.9±3.0 |
| C | — | 8205±682 | 38.37±3.10 | 1.35±.32 | — | — | 53.8±2.3 |
| D | 5247 | 7308±682 | 27.06±3.02 | 1.12±.18 | 0.089±.014 | — | 39.0±4.7 |
| E | 5660 | 8825±592 | 35.96±6.32 | 1.47±.06 | 0.098±.005 | — | 47.4±2.3 |

[1]ASTM D790-66; crosshead speed 0.254 cm/min; 2.54 cm × 15.24 cm × .22 cm test piece.
[2]ASTM D638-64 crosshead separation 0.05 cm/min; 2.54 × 15.24 cm × .22 cm dumbell with .64 cm cross section.
[3]Distance traveled by Instron crosshead before sample failed in flexure.
[4]Conrol Experienced slight expansion not shrinkage. CDB modified compounds experienced slightly more expansion than control.
[5]Average of 12-20 determinations ASTM 2583-67.
[6]Aged 8 days or 20 days is the time the compound sat at 25° C. before being molded and cured.

What is claimed is:

1. A method for preparing an elastomer modified thermosetting unsaturated polyester molding compound having improved surface appearance, toughness and impact strength comprising preparing a first paste component comprising a mixture of an unsaturated polyester component, a free radical polymerizable monomer component, and an inorganic particulate filler component, preparing a second paste component comprising a mixture of a conjugated diene butyl elastomer copolymer component, a free radical polymerizable monomer component and an inorganic particulate filler component, and combining said first and second paste components.

2. The method of claim 1 including adding a thermoplastic polymer additive component to at least one of said first and second paste components.

3. The method of claim 1 including adding a thermoplastic polymer additive component to said mixture of said first and second paste components.

4. The method of claim 1 including adding a fibrous or filamentary reinforcing agent to said mixture of said first and second paste components.

5. The method of claim 1 wherein said free radical polymerizable monomer component comprises styrene in both said first and second paste components.

6. The method of claim 1 wherein said inorganic particulate filler component comprises calcium carbonate in both said first and second paste components.

7. The method of claim 3 wherein the ratio of said unsaturated polyester component to said conjugated diene butyl elastomer component and thermoplastic polymer components ranges from about 5:1 to 1:1.

8. The method of claim 1 including adding a free radical polymerization initiator to said mixture of said first and second paste components.

9. The method of claim 1 including adding a thickening agent to said mixture of said first and second paste components.

10. The method of claim 9 wherein said thickening agent is selected from the group consisting of the oxides and hydroxides of the metals of Group IIA and IIB of the Periodic Table.

* * * * *